(No Model.)
R. L. CALDWELL.
TROLLEY WIRE CONNECTION.
No. 459,485. Patented Sept. 15, 1891.
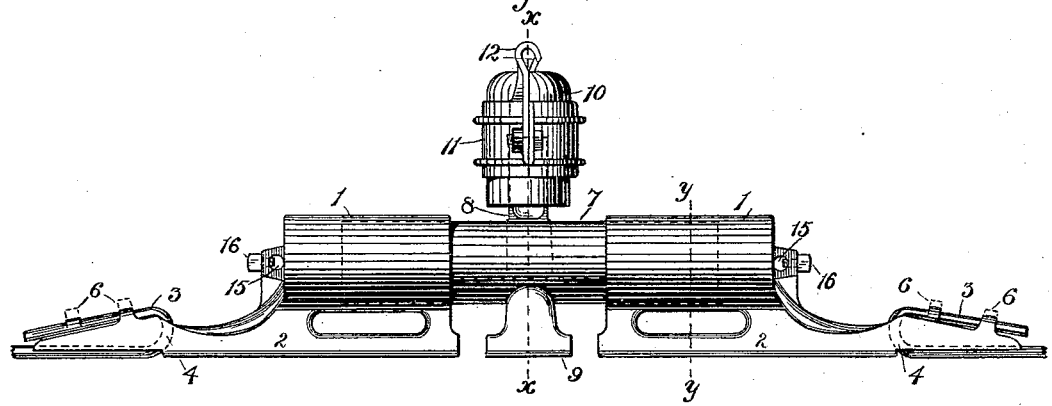
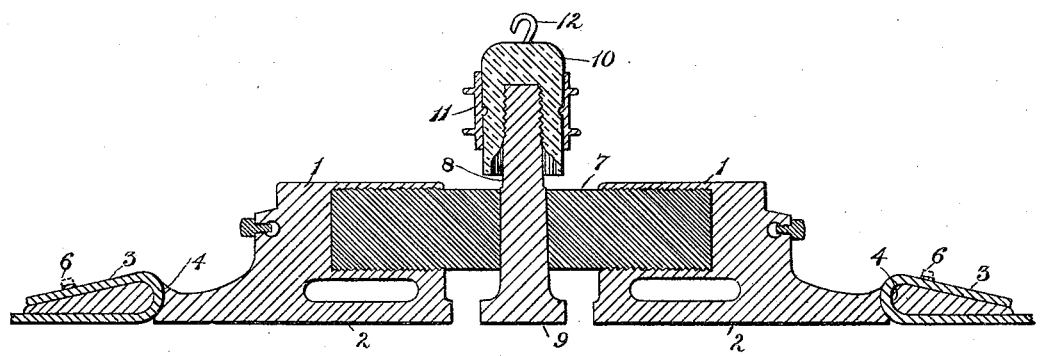
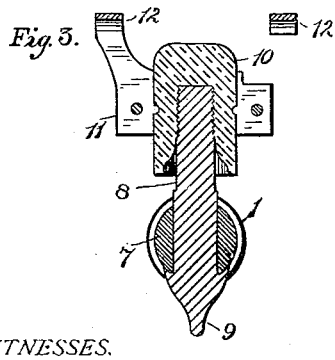
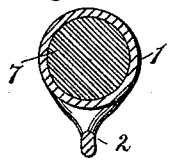
WITNESSES.
Alvan Macauley.
Thomas Durant.
INVENTOR.
Robert L. Caldwell
by Church & Church
his ATTORNEY.
THE NORRIS PETERS CO., PHOTO-LITHO., WASHINGTON, D. C.

UNITED STATES PATENT OFFICE.

ROBERT L. CALDWELL, OF ROCHESTER, NEW YORK.

TROLLEY-WIRE CONNECTION.

SPECIFICATION forming part of Letters Patent No. 459,485, dated September 15, 1891.

Application filed June 10, 1891. Serial No. 395,785. (No model.)

*To all whom it may concern:*

Be it known that I, ROBERT L. CALDWELL, of Rochester, in the county of Monroe and State of New York, have invented certain new and useful Improvements in Trolley-Wire Connections; and I do hereby declare the following to be a full, clear, and exact description of the same, reference being had to the accompanying drawings, forming a part of this specification, and to the figures of reference marked thereon.

My present invention has for its objects to provide a connection for the trolley-wires of electrical railways, more particularly adapted for the ends of adjoining sections fed from separate feeders from the power-station, either of the same or different polarities, whereby the trolley will pass from one section to the other without liability of becoming displaced or of forming an arc operating to burn off the ends of the adjacent conductors, as devices at present in use are apt to do; and it further has for its object to provide a device simple and cheap in construction to which the ends of the wires can be securely and readily attached and to these and other ends it consists in certain novelties of construction and combinations of parts, all as will be hereinafter fully described, and the novel features pointed out in the claims at the end of this specification.

In the drawings, Figure 1 is a side elevation of a support constructed in accordance with my invention; Fig. 2, a longitudinal sectional view of the same; Fig. 3, a cross-section on the line *xx* of Fig. 1; Fig. 4, a cross-section on the line *y y* of Fig. 1.

Similar numerals of reference indicate similar parts.

In carrying out my invention I provide two end pieces or castings 11, to which the wires of the two adjoining sections are attached, the under side thereof being formed into a rib 2, with which the trolley on the motor-car co-operates, and the outer portion of this rib is grooved on its inner side, forming a seat for the accommodation of the wire 3, which passes along in it, (its outer side being level with the rib 2,) thence up through a perforation 4, and is bent around over the upper side of the piece 1, where it is secured by means of lugs or ears 6, formed on the latter and adapted to be bent down, as in Fig. 1, over the end of the wire. These ears 6 are formed integral with the sections 1, preferably brass, and strong enough to be bent down without breaking and to securely hold the end of the wire, which is also secured by the bight formed in its end, so that little strain will come on the lugs. This arrangement could, it will be undertood, be employed on other styles of trolley-wire connections than that hereinafter described with good results.

The sections 1 of the hanger are provided in their proximate sides with sockets in which are inserted the opposite ends of a piece of some strong insulating material 7, such as wood coated or impregnated with okerite, tar, rubber, or other non-conducting material, the connection between the connecting-piece and the sections 1 being formed in any suitable manner, as by casting threads or lugs in the interior of the sockets and forcing or screwing the piece 7 therein.

It is desirable in connecting the ends of adjacent though separate sections of a trolley-line that more than one break be made between them, as otherwise the trolley in passing from one line to the other will form an arc that will burn off the ends of the proximate conductors; and with a view to obviating this difficulty and also to form a bearing-surface for the trolley and at the same time a support for the device, I provide a central pin 8, having on its lower end a rib 9, corresponding to and on a level with the ribs 2 on the end sections 1, and above this is a shoulder engaging with the lower side of the connecting-piece 7, and serving in the present instance to support it. Above the piece 7 the pin 8 is screwed into a piece of insulating material 10, such as okerite, hard rubber, or other similar material, to which is attached a band 11, provided with hooks 12 or other means for securing it to a supporting cross-wire. (Not shown.) It will now be seen that the trolley of the motor-car passes from one section of the line which is formed by one of the end pieces 1 to the other end piece, being supported between them by the rib 9 of the pin, which, however, is not electrically connected with either end piece 1, thereby forming two breaks between the two sections, so that an arc will not be formed between them as the trolley passes from one to the other, which would, if formed, burn off the end of the ribs.

When for any purpose it is desired to connect two adjacent sections, this may be accomplished by means of a connecting-wire, the ends of which may be inserted in apertures 15 formed in the end pieces 1 and secured by set-screws 16.

This device is simple, cheap, and durable, and, as I have found in practice, admirably adapted for the purpose.

It will be understood that if it is not desired to employ the device herein described as a suspending device it could be employed to connect the ends of adjacent circuits or wires without employing the suspending devices herein shown as attached to the insulating connecting-piece.

I claim as my invention—

1. A support for the end of a trolley-wire, having a seat for the wire, a perforation for the passage of the end of the wire, and lugs on the side opposite the seat adapted to engage and retain the end of the wire when passed through the perforation and bent over, substantially as described.

2. A connecting device for trolley-wires, having at opposite ends seats for the wires, perforations for the passage of the ends of the wire, and the lugs on the side opposite the seats adapted to engage and retain the ends of the wires when passed through the perforations and bent over, substantially as described.

3. The combination, with the end sections to which the wires are connected, having the sockets and the ribs thereon, of the piece of insulating material entering the sockets and securing the end sections together, substantially as described.

4. The combination, with the end sections to which the wires are connected, having the sockets and ribs thereon, of the piece of non-conducting material entering the sockets and the rib connected thereto, arranged between the ribs on the end sections, substantially as described.

5. The combination, with the end sections to which the wires are connected, having the sockets and ribs thereon, of the piece of non-conducting material entering the sockets, the suspending-pin passing through it, and having the rib arranged between the ribs on the end sections, substantially as described.

6. The combination, with the end sections to which the wires are connected, having the sockets therein, of the piece of non-conducting material entering the sockets, the suspending-pin passing through it, having the rib arranged between the end sections, the piece of insulating material engaging said pin, and suspending devices attached to it, substantially as described.

ROBERT L. CALDWELL.

Witnesses:
FRED F. CHURCH,
A. A. DAVIS.